United States Patent
Dressler

[19]

[11] Patent Number: 6,052,987
[45] Date of Patent: Apr. 25, 2000

[54] NON-PROPELLANT FLUID COOLED SPACE CRAFT ROCKET ENGINE

[75] Inventor: Gordon A. Dressler, Manhattan Beach, Calif.

[73] Assignee: TRW Inc., Redondo Beach, Calif.

[21] Appl. No.: 08/970,915

[22] Filed: Nov. 14, 1997

[51] Int. Cl.[7] .................................................. F02K 9/42
[52] U.S. Cl. ............................................. 60/260; 60/267
[58] Field of Search ............................ 60/257, 260, 267, 60/736

[56] References Cited

U.S. PATENT DOCUMENTS

| | | | |
|---|---|---|---|
| 2,900,168 | 8/1959 | Nyborg | 60/260 |
| 3,049,870 | 8/1962 | Chamberlain | 60/260 |
| 3,516,254 | 6/1970 | Hammond | 60/260 |

FOREIGN PATENT DOCUMENTS

| | | |
|---|---|---|
| 2640322 | 6/1990 | France . |
| 56-096306 | 12/1982 | Japan . |
| 792909 | 4/1958 | United Kingdom . |
| 9526467 | 10/1995 | WIPO . |

Primary Examiner—Louis J. Casaregola
Attorney, Agent, or Firm—Michael S. Yatsko; Ronald M. Goldman

[57] ABSTRACT

A space craft's rocket engines are cooled by a recirculating cooling system containing a non-propellant coolant fluid, such as water and/or ethylene glycol. With that recirculating cooling system to maintain the rocket engine combustion chamber at a lower temperature, spacecraft rocket engines may be constructed less expensively and can operate with greater safety by employing the more common metals in their construction. The cooling system also provides an easy means to warm and/or vaporize a propellant.

14 Claims, 3 Drawing Sheets

NON-PROPELLANT FLUID COOLED SPACE CRAFT ROCKET ENGINE

FIELD OF THE INVENTION

This invention relates to space craft propulsion systems and, more particularly, to an improved cooling system for on-board rocket engines used aboard space craft.

BACKGROUND

Rockets and missiles launched from or near the Earth's surface to deliver payloads into sub-orbital or orbital trajectories is are forms of space craft that employ rocket engines in one or more stages for necessary propulsion. More customarily referred to as spacecraft are the payloads which are lofted into space and are intended to remain in orbit for at least some predefined period, such as the familiar and successful Space Shuttle. The Space Shuttle requires very reliable rocket engines to perform attitude and velocity control maneuvers during launch, on-orbit and descent phases of space flight. For the protection of on-board personnel, payloads and the high value vehicle, those rocket engines are also required to have high margins of safety. To ensure the Space Shuttle's continuing success, much consideration has been given to upgrading its propulsion system. Some major purposes to an upgrade are to shift to rocket propellants that are non-toxic, such as liquid oxygen and ethanol, and to lower operating costs.

Such an upgrade requires new rocket engine designs. However, those new designs are found to raise formidable thermal issues: How to cool the rocket chambers during firing operations in both the pulsing or steady state modes of operation and, in respect of bipropellant rocket engines that react fuel and oxidizer to generate thrust, how to vaporize liquid oxygen prior to injection of the oxygen into the rocket engine to achieve reliable on-demand rocket bursts, particularly in the smaller size "vernier" rocket engines.

As those skilled in the art appreciate, some present rocket engines are cooled by radiating the heat generated in the engine into space. Such rocket engines are designed to operate at a temperature close to the melting point of the metals from which the rocket's combustion chamber is constructed, leaving a small thermal margin of safety. As higher operational temperatures are attained to gain greater engine performance from existing rocket engine designs, more exotic and expensive refractory materials are required for the combustion chamber construction. One such material is Columbium, which withstands continuous operating temperatures below 1350 degrees Centigrade. That metal is rare and difficult to work. Thus, obtaining higher rocket engine performance from systems relying principally on radiation cooling is inconsistent with the companion goal of reducing manufacturing costs.

As an alternative, fluid cooling is commonly employed in other in-flight rocket engines, such as the SCAT engine marketed by the present assignee, but those engines always use one of the available propellants as the coolant. This cooling technique is referred to as "regenerative cooling". In that approach, typically, the combustion chamber is maintained at acceptable temperatures by transferring heat to one propellant that is ducted externally along the engine's hot surfaces; the cooling propellant is thereby warmed and/or vaporized before being injected into the rocket engine's main combustion chamber for reaction with the other propellant. In such systems, it is much more difficult to provide large thermal margins for engine operation, since the cooling propellant cannot be discarded, the propellant's heat capacity is fixed and is generally less than that of water, and the available propellant flow rates and pressure are severely limited. The resulting high temperatures of the flight combustion chamber wall and the need for compatibility with the oxidizer or fuel require that the chamber and cooling paths be complex in design and fabricated of more expensive materials and fabrication techniques.

Water cooling of machinery and engines is not new and water cooling systems for such apparatus has long been known. Indeed recirculating cooling systems, using Freon instead of water, are used presently in the Space Shuttle active thermal control subsystem (ATCS) for thermal management of several other subsystems and payloads, during missions. A recirculating coolant system more likely familiar to the lay person is the cooling system found in automobiles, wherein coolant, a mixture of water and ethylene glycol ("anti-freeze"), is pumped from the auto's radiator, which is the coolant reservoir and heat exchanger, by the water pump into the engine block. The coolant flows through cooling channels in the automobile engine, contacting the hot metal, whereby, some of the engine's heat of combustion is conducted to the flowing coolant, and, heated, flows out the engine, through the thermostat, and returns to the radiator as hot coolant. The radiator fan and/or the auto's movement blows air against the radiator, transferring heat from the radiator fins to the ambient air, thereby cooling the coolant, as the coolant flows from the radiator's inlet to the radiator's outlet, where the coolant is again pumped back into the engine. As one appreciates, a water cooling apparatus takes up additional space and adds weight in comparison to air cooling systems or radiant cooling systems.

Because of its con venience and effectiveness on the ground, water has also been used to cool rocket engine prototypes in on-the-ground testing throughout the history of liquid rocket propulsion. Water has one of the highest known specific heat capacities of any fluid, is inexpensive and is in plentiful supply. With its high specific heat capacity, water can be used to remove very large amounts of heat from combustion chamber walls.

With a plentiful supply of inexpensive water available at the test site, such as supplied by a municipal water company, the water main's spigot is turned on and fresh water flows into the test plumbing and is routed along the rocket combustion chamber walls. In the conductive thermal exchange relationship with the rocket engine, the flowing water draws heat away from the engine. The heated water flows from the rocket engine and into a drain, where it's simply discarded. Overall, the procedure is no more complicated than opening the water tap to obtain a drink of water, and pouring the unconsumed water down the drain. As those skilled in the art appreciate, the foregoing ground test cooling system is essentially an "open loop" cooling system.

When evaluating experimental rocket engine designs, because of the easy availability of such an effective coolant source on the ground, the prototype rocket engines can be equipped with combustion chamber walls that are formed of very inexpensive and easily shaped materials, such as steel or copper, whereby proving the design is accomplished at a relatively low cost. However, when the design is proven and finalized and a rocket engine is built for flight use, the more exotic metals, capable of withstanding the high temperatures encountered for radiation cooling of the rocket engine, are substituted for the copper and steel components. It has thus been easy to provide large thermal margins in ground tested rockets by proper selection of heat transfer geometry, fluid flow velocity and operating pressure.

The open loop cooling system for prototype testing is seen as simple, effective and inexpensive, and offers no incentive to discover a more exotic cooling system or better coolant for the test application.

Thus, a principal object of the present invention is to improve upon the safety margin, operational reliability, operational life and performance of space craft rocket engines and concurrently reduce the engines construction cost.

A further object of the invention is to provide a space craft propulsion system with a new cooling system that minimizes reliance on radiant cooling.

And a still further object of the invention is to provide a rocket engine cooling technique for in-flight use that employs a separate non-propellant fluid as a coolant, the non-propellant fluid having a significantly greater heat capacity than propellant fluids, in which the non-propellant fluid is reused and not discarded.

SUMMARY OF THE INVENTION

In accordance with the foregoing objects and advantages, the present invention combines a flight rocket engine with a recirculating cooling system for cooling the rocket engine. The cooling system uses a non-propellant fluid having a high heat capacity, such as water and/or ethylene glycol, as the coolant fluid. Additionally, as part of the recirculating coolant system, a portion of the heat transferred from the rocket engine to the coolant is transferred by the coolant to a liquid propellant to warm and/or vaporize the liquid propellant prior to its injection into the rocket engine. The novel combination includes a coolant fluid reservoir, a coolant pump, a heat exchanger for an associated rocket engine, and another heat exchanger for the liquid propellant conduits. Those component elements are arranged in a recirculating coolant loop in which the second heat exchanger follows the first.

Although the added weight and volume of the coolant system initially may be viewed as a drawback if separately considered, when viewed in overall perspective, the advantages attendant to the new combination in reducing rocket engine material cost, complexity and production time, and the additional safety of an enhanced thermal margin far outweighs any inconvenience caused by the added weight, volume and electrical requirements of the new combination.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DETAILED DESCRIPTION OF THE PREFERRED EMBODIMENTS

Figure 1:
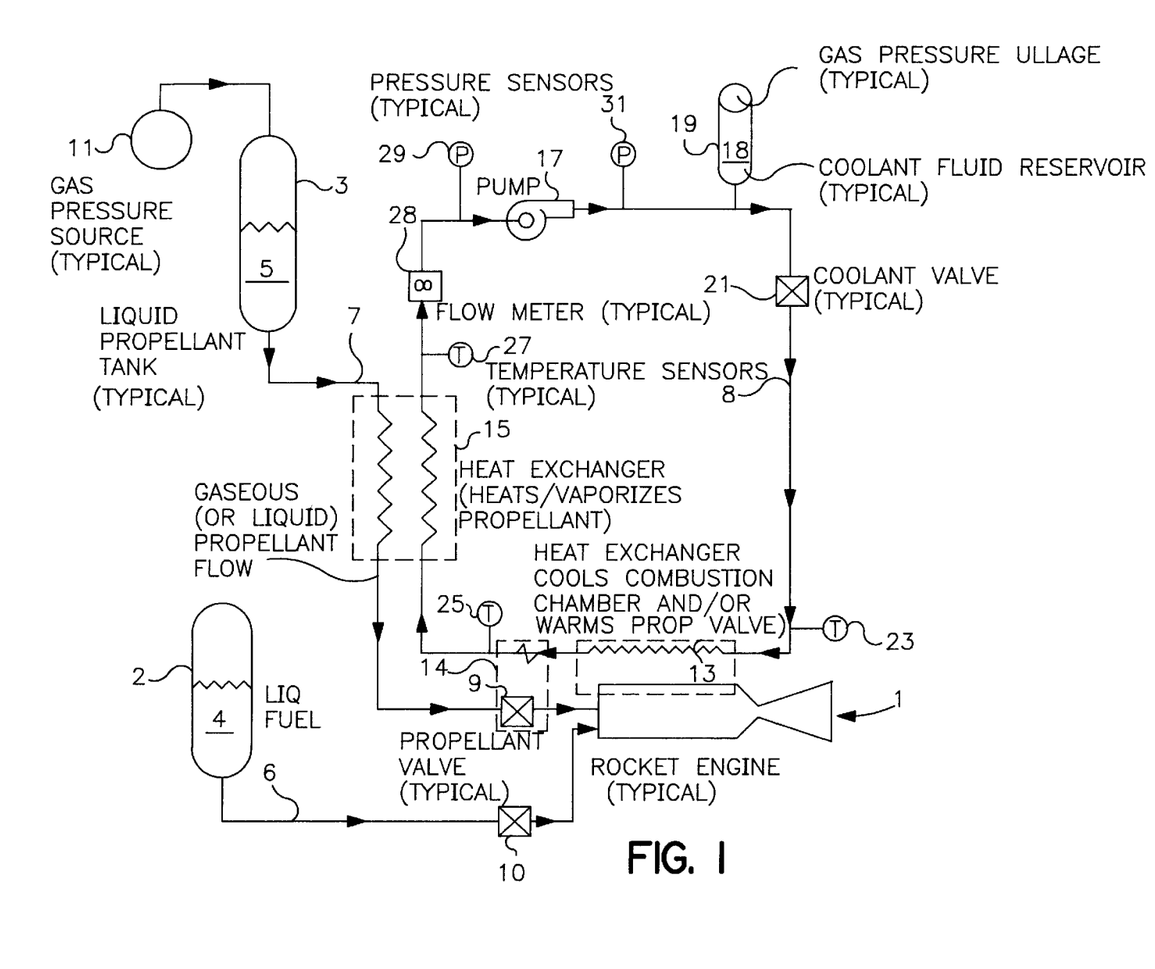
FIG. 1 schematically illustrates an embodiment of the invention.

Reference is made to FIG. 1, which schematically illustrates an embodiment of a space craft rocket engine system constructed in accordance with the invention. As there shown a conventional bipropellant type rocket engine 1 is supplied from a pressurized storage tank or reservoir 3 with propellant oxidizer 5 via conduit 7 and electrically operated propellant valve 9 and is also supplied from a storage tank or reservoir 2 with a propellant fuel 4 via conduit 6 and an electrically operated fuel valve 10. Gas pressure source 11, connected to the top end of the reservoir, provides a pressure to assist dispensing liquid propellant 5 from the storage tank into the conduit in a conventional "blow down" mode. Similarly, a gas pressure source or internal gas ullage, shown, assists dispensing fuel from reservoir 2. The cooling system for the engine includes heat exchanger 13, heat exchanger 14, which is optional, heat exchanger 15, electrically operated coolant pump 17, coolant fluid storage tank or reservoir 19, and electrically operated coolant fluid valve 21. Those elements are connected together in a coolant loop by a conduit 8. The foregoing shows a single rocket engine to better assist in understanding the invention, it being understood that, as later herein described in connection with the additional embodiments, multiple rocket engines are preferred.

Figure 2:
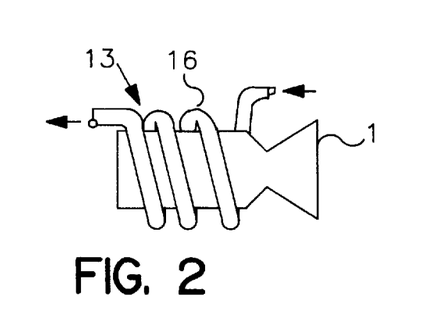
FIGS. 2 and 3 pictorially illustrate heat exchangers used in the embodiment of FIG. 1.

Heat exchanger 13 is connected serially within the coolant loop. It contains an inlet and outlet for respectively admitting the coolant fluid from the conduit and expressing coolant fluid back into that conduit for continued flow to the next heat exchanger 14. Heat exchanger 13 is in a conductive heat exchange relationship with the rocket engine. In practice this is accomplished, for one, by a coil of tubing, as symbolically represented in the drawing figure, wrapped around and physically contacting the rocket engine casing, as pictorially illustrated as 16 in FIG. 2 to which brief reference may be made. Alternatively, the heat exchanger may be formed integral with the rocket engine, by fabricating coolant passages within the rocket engine walls, much like is done in automobile engines.

Figure 3:
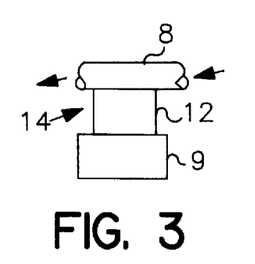

Heat exchanger 14 is serially connected within the coolant loop with its inlet end located at the outlet end of heat exchanger 13 and its outlet end connected to the next heat exchanger 15. The heat exchanger has a heat exchange or transfer relationship with propellant valve 9 for reasons discussed in connection with the operation of the system. This heat exchanger is rudimentary in nature and is simply formed by a short length of the metal conduit that extends from the outlet of heat exchanger 13 and, as pictorially illustrated in FIG. 3 to which brief reference is made, a block 12 of heat transmissive metal, such as copper, that is wedged between the conduit and the valve surface. Alternatively, a more rudimentary form of heat exchanger may be employed that is formed by routing the coolant fluid conduit directly against the propellant valve to provide a conductive path between the two elements.

Heat exchanger 14 is optional and not critical to the invention. Other embodiments of the invention need not include that heat exchanger, and in such alternative embodiments, the outlet of heat exchanger 13 is connected serially with the inlet of heat exchanger 15, next described, via conduit 8.

Heat exchanger 15 is also connected serially within the coolant conduit loop formed by conduit 8 and provides a conductive heat transfer relationship between the coolant fluid in the conduit 8 and the propellant oxidizer supply conduit 7. The heat exchanger contains an inlet and outlet for respectively admitting the coolant fluid in the conduit that arrives after flowing through the prior heat exchangers 13 and/or 14 and expressing that coolant to flow to the inlet of coolant pump 17. It also contains a second inlet and outlet for respectively for admitting propellant fluid oxidizer from conduit 7 and expressing that propellant back into the conduit to continue flow to propellant valve 9. This heat exchanger may be of a form of interleaved coils of metal tubing. One of those coils is serially connected in the coolant loop, the other is serially connected in the propellant fluid oxidizer feed system. It is appreciated that the elements of the foregoing system, separately considered, are of known construction.

In operation, by appropriate signals from a command source, electrically operated valves, not illustrated in detail, controlling the supply of propellant from storage tanks 2 and 3, are opened allowing the propellants to flow, and the electrically operated propellant valves 9 and 10 to the engine are opened to permit the propellants to enter engine 1. Propellant oxidizer flows from its storage tank through conduit 7 to the propellant valve 9, where the fluid oxidizer is heated or vaporized and, flowing into and through the valve, is supplied to rocket engine 1. Concurrently, propellant fuel flows from storage tank 2 through conduit 6 and fuel valve 10 and into a separate inlet into engine 1. In the engine, the propellants react and create a thrust upon expulsion out the rocket nozzle and also generate a good deal of heat about the rocket engine's casing as a side effect.

Coolant tank 19 supplies coolant 18 into the conduit 8, the flow being assisted by typical gas pressure ullage in the tank. As those skilled in the art appreciate other known techniques and structures are available to motivate fluids out of tanks 2, 3 and 19. Any of those fluid motivating techniques and structures may be added and/or substituted in the combination for the gas pressure ullage without departing from the scope of the present invention.

It is recalled that the system is in operation in outer space and that the elements are relatively weightless. With appropriate electrical signals from the command module, not illustrated, applied to the pump 17 and coolant valve 21, the pump is operating and the valve is opened. With coolant valve 21 opened and pump 17 operating, coolant flows through conduit 8 and through heat exchanger 13, there receiving heat generated in the rocket engine. Now increased in temperature, the coolant flows through heat exchanger 14, some heat is supplied to that valve to enhance its operation, and then flows into heat exchanger 15.

Heat exchanger 15 transfers some heat to the propellant in conduit 7, thereby warming the propellant as the latter flows through the heat exchanger along conduit 7. Sufficient heat may be transferred to vaporize the propellant. In this respect the coolant fluid may be regarded as a "heater" fluid as it is transferring heat to raise the temperature of an element, not to cool the element. It is understood that the term coolant fluid is merely an accepted term for a fluid heat transferring medium, all of which are reciprocal in nature and can both accept heat and surrender heat. The term is descriptive only of its intended principal function, which is to accept heat.

Continuing with the operation, from heat exchanger 15, the coolant returns to the inlet of pump 17, and is pumped back into the coolant. So long as valve 21 remains open and the pump is operating, the coolant fluid recirculates in the defined loop.

It should be recognized that not all of the heat absorbed in the coolant fluid is used to heat the propellant oxidizer 5 and/or propellant valve during the coolant's circulation through the loop. Some residual heat is retained in the fluid by nature of its heat capacity as it enters pump 17 for recirculation in the coolant loop. The coolant reentering the coolant loop may mix with the coolant in reservoir 19 some heat may be diluted within the larger quantity of the latter coolant. Coolant reservoir 19 thus may also function as a heat sink, absorbing residual heat that is not transferred from the coolant to the propellant and/or other devices while circulating through the remainder of the coolant loop.

However, such heat dilution due to reservoir 19 is not a requirement of the invention. By design in a practical embodiment the amount of fluid contained in conduit 8 and associated devices that are serially connected, the design of the heat exchangers, and the operating time and flow rate are chosen so as to assure that the coolant never exceeds a maximum allowable temperature, avoiding any requirement to have the fluid reservoir 19 serve as a meaningful heat sink.

Some of the heat retained in the circulating coolant is recognized as providing an ancillary benefit, in the event the time between rocket firings is of long duration. Some of that retained heat will be applied by the circulating coolant to the propellant valve or valves and to the fluid propellant before the next engine firing is to occur, allowing that residual heat to condition the engine's propellant valve(s) and heat the propellant. This avoids a "cold" engine start.

One appropriate coolant fluid 18 for the system is water. Pure water, such as distilled water, however, is recognized as being somewhat corrosive, and appropriate additives should be added, such as those found in automobile usage, known as rust inhibiters. One of those additives is ethylene glycol, better known as anti-freeze. It also prevents the water from freezing unless the temperature is very very low. Alternatively, in other embodiments, ethylene glycol may be used as the coolant fluid. In general, any fluid commonly referred to as a refrigerant, may also be used as the coolant fluid. Of the later, Freon and Ammonia are preferred examples. Ammonium is inexpensive and commonly available. Although Ammonium is toxic and, therefore, inappropriate for manned space craft, it is suitable for use in unmanned space craft in which the invention is employed.

To monitor operation, the system preferably includes various sensors. Flowmeter 28 is connected serially in the coolant loop and provides information on the fluid flow rate. Pressure sensors 29 and 31 monitor the fluid pressure at the pump's inlets and outlets, respectively. Temperature sensor 23 is incorporated to sense the temperature of the coolant at the inlet to heat exchanger 13; temperature sensor 25 monitors the coolant temperature between the two heat exchangers; and temperature sensor 27 monitors the coolant temperature at the outlet of heat exchanger 15. The output of the sensors is individually coupled to appropriate control and display apparatus, not illustrated, which provides the information in a useable form.

As example, the system can be operated and if found to be operating normally, the sensor readings establish an appropriate "base line" for normal operation. Significant departures from that base line indicate potential problems. In one form of operation, it is expected that the pressure in the coolant line should be higher than the pressure in the combustion chamber of rocket engine 1. Should the wall of the combustion chamber develop a small crack, the coolant would flow into the combustion chamber and the fluid pressure would immediately drop. In another form of operation, the normal operation would have the coolant fluid pressure be lower than the combustion chamber pressure. Should a crack develop in the combustion chamber wall, hot gases would flow directly into the coolant fluid, quickly raising the temperature and pressure of the fluid to an above normal level. The sensors allow detection of that failure.

Figure 4:
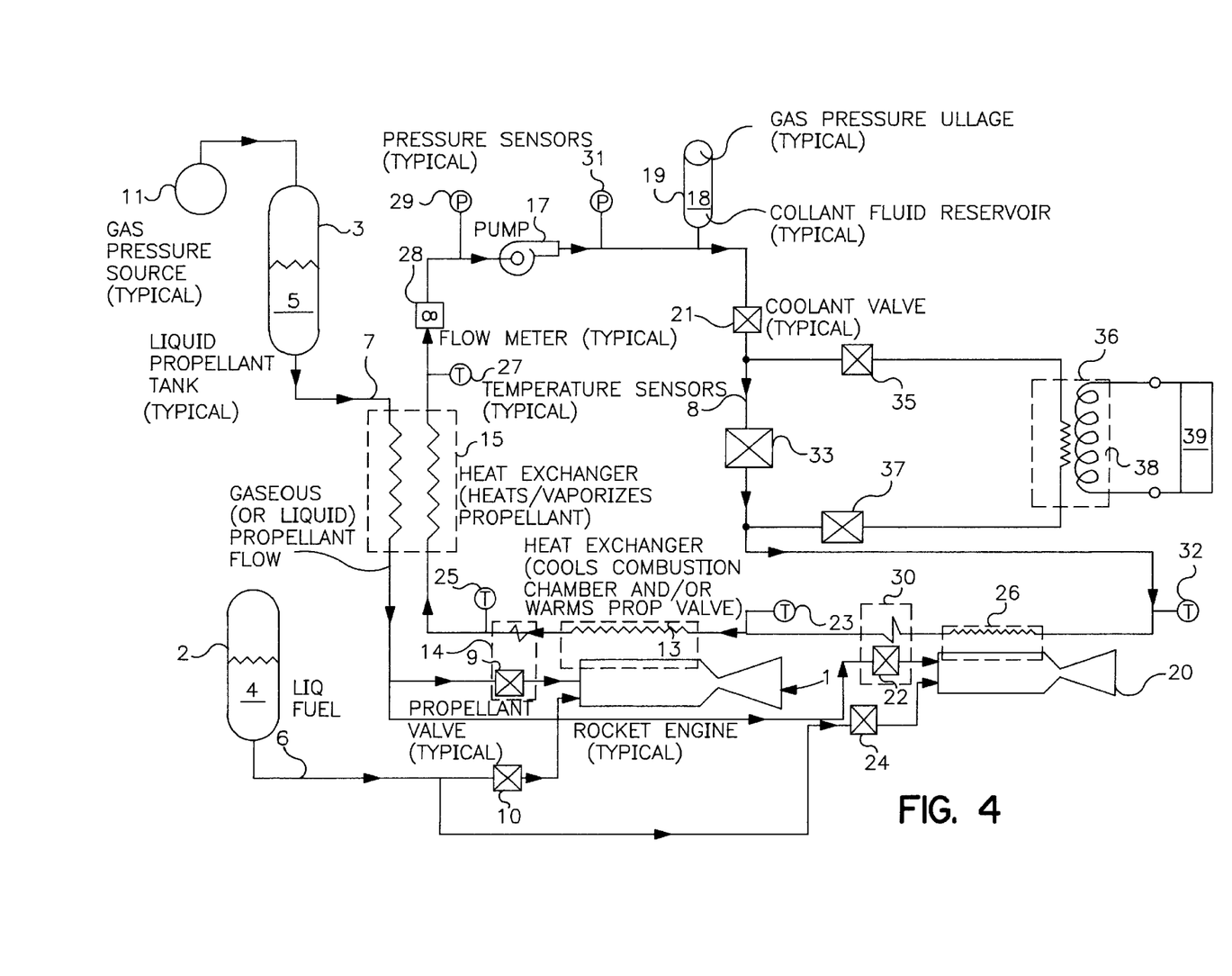
FIG. 4 schematically illustrates another embodiment of the invention containing multiple rocket engines a nd an auxiliary heating source.

Given the understanding of the foregoing embodiment, reference is made to the more versatile embodiment presented in FIG. 4. For convenience, those elements appearing in the previous embodiment, which appear in this alternative embodiment are identified by the same number in FIG. 4 and the description of those elements need not be repeated in detail.

This embodiment includes a second bi-propellant rocket engine 20, propellant oxidizer and electrically operated fuel valves 22 and 24, a heat exchanger 26, which is associated with the rocket engine, and heat exchanger 30, associated with propellant oxidizer valve 22. The propellant valves are fed with propellants via respective branch conduits to the respective oxidizer and fuel conduits that extend to the storage tanks. Each heat exchanger contains inlet and outlet ends. Heat exchanger 26 is connected serially in the coolant loop and heat exchanger 30, which follows the former in that loop, is connected serially in the loop between the outlet end of the former and the inlet end of heat exchanger 13 associated with rocket engine 1. The propellant valves are connected to and electrically operated by the command module, not illustrated, in the same manner as the corresponding valves of rocket engine 1. An additional temperature sensor 32 is included to monitor the coolant temperature at the inlet of heat exchanger 26.

It may be noted that in customary practice the two engines are not fired simultaneously. One may be fired frequently, and the other fired rarely. In that context one may consider the same mode of operation described in connection with the embodiment of FIG. 1, when engine 20 is operated frequently and rocket engine 1 is fired rarely. Propellant valve 9 associated with rocket engine 1, being rarely used, could conceivably "freeze up" due to low ambient temperature, absent heat supplied by the cooling system described. Since engine 20 generates heat, that heat is transferred to the coolant flowing through heat exchangers 26, 30, 13 and 14. The heated coolant flowing through heat exchanger 14 transfers heat to the colder propellant valve 9, thereby preventing the valve from freezing up due to low ambient temperatures.

The embodiment of FIG. 4 also includes, as an option, three additional electrically operated coolant valves 33, 35 and 37, and an additional heat exchanger 36 and associated fluid conduits. The valves are controlled by signals supplied by the command module, not illustrated. One side of heat exchanger 36 is connected to an external source of heat, which may be an electrical heater coil 38, schematically illustrated in the figure, that is supplied with electric current from a DC power supply 39.

Using an electrical heater to produce heat is recognized as but a single example of a heat source. Alternatively, in other embodiments, other available external sources of heat may be substituted for electrical heater 38, also making appropriate internal changes in the structure of the heat exchanger. As example, waste heat from other subsystems on-board the space craft may be ducted to heat exchanger 36 to supply the desired heat. By using heat that otherwise is wasted, the latter alternative increases the overall operating efficiency of the space craft and is preferred, if available and reasonably practicable.

Valve 33 defines one branch for the coolant flow between valve 21 and the heat exchanger associated with a rocket engine. Valves 35 and 37 define a second alternate branch for that coolant flow. Valves 35 and 37 are connected in series with a coolant branch extending through heat exchanger 36; and the two valves are normally closed, blocking that route. Valve 33 is normally open, giving the coolant branch in which it is serially placed, predominance over the alternate branch through valve 35, allowing coolant to flow from valve 21 directly to the heat exchanger associated with the first engine in the chain. When operated, the valve closes the section of conduit to block that flow and force the fluid to flow through the alternate branch through valve 35.

When valves 33, 35 and 37 are operated, valves 35 and 37 allow coolant fluid to flow from valve 21 through heat exchanger 36 to the inlet end of the heat exchanger associated with the rocket engine first in line in the coolant loop, here heat exchanger 26 associated with rocket engine 20.

The foregoing circuit provides a means for introducing thermal energy created from a source external to the rocket engine system, other than the rocket engines, such as an electrical heater, as example, to the coolant, raising the coolant's temperature. If the rocket engine firings are too infrequent, and, hence, the heat generation infrequent, and if it is desired to maintain the coolant fluid at a minimum temperature, then heat must be added to ensure the coolant remains at or above that specified temperature.

With neither engine 13 or 20 being operated and the command module monitoring coolant temperature at the temperature sensors, should the coolant temperature fall below the specified minimum, the command module supplies the signals to operate pump 17, valves 21, 33, 35 and 37 and connects a source of electric current 39 to the heater coil 38. Coolant fluid flows through the loop, through heat exchanger 36, the heat exchangers associated with the engines and the propellant oxidizer, and back to the pump.

As the coolant flows into heat exchanger 36, the coolant is heated thereby drawing heat away from the heater coil and the coolant exits the heat exchanger outlet raised in temperature. As the coolant flows through each of the heat exchangers associated with the engines and propellant valves, the coolant gives up heat to the engine and, importantly, transfers heat to the propellant valves. In this way the propellant valves are maintained above a minimum temperature ensuring that they do not become frozen due to the low ambient temperature during long periods of engine inactivity and remain ready for use.

Present practice in spacecraft is to maintain a back up set of rockets for use should the principal set of rockets fail. In like manner the back up set of rockets should preferably include a separate cooling system. Alternatively, an additional set of coolant transfer valves can be included to switch over the cooling system from operation with the principal set of rockets to use with the back up set. The latter alternative imposes less weight and volume requirements upon the space craft.

The foregoing systems employ bipropellant rockets. Monopropellant rockets rarely generate the high heat levels generated by bipropellant rockets. However, if in the future a monopropellant engine is developed that develops such high temperatures, those skilled in the art recognize that the present invention can be modified for use with such engine. The overall system would be the same configuration as illustrated in FIGS. 1 and 4 with the propellant oxidizer tank being replaced by a propellant fuel tank, and the propellant fuel tank and associated engine valves shown in the figures being deleted.

Figure 5:
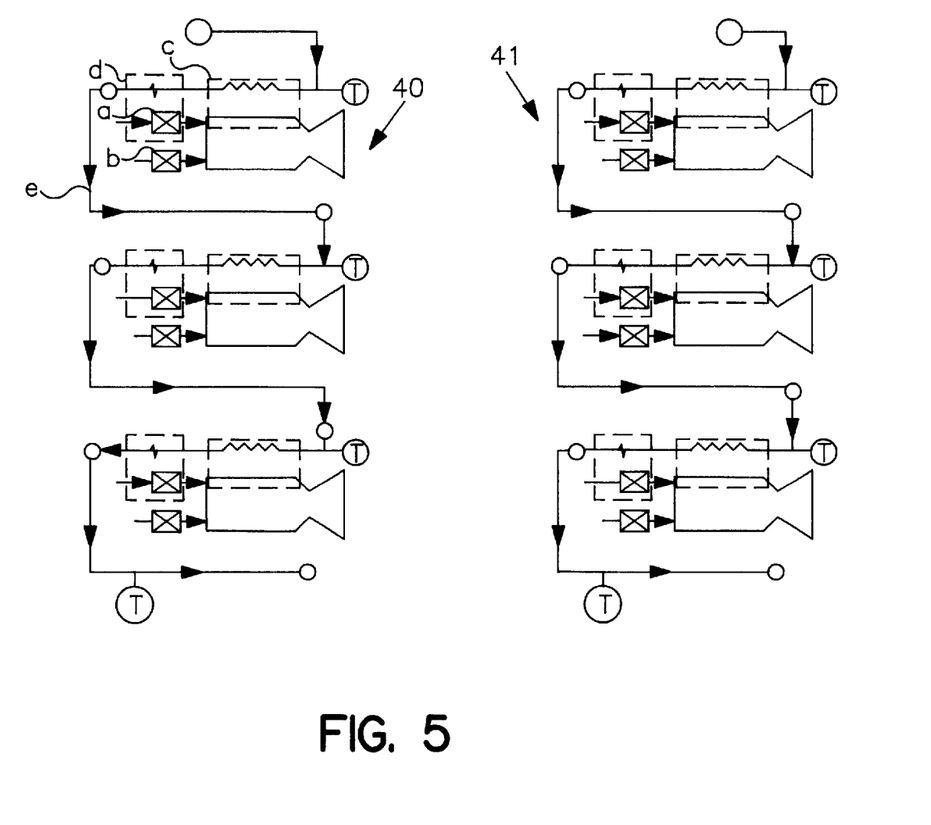
FIG. 5 schematically illustrates multiple rocket engine and heat exchanger arrangements for use in the propulsion systems of FIG. 1 and 4.

FIG. 5 schematically illustrates two chains 40 and 41, each containing three bipropellant rocket engines and associated propellant valves and heat exchangers. Each rocket engine has associated therewith a pair of propellant valves, a and b, for admitting propellants to the engine, the engine heat exchanger c and, connected in series with the latter, the propellant valve heat exchanger d. The outlet of the propellant valve heat exchanger d is connected in series with the heat exchangers in the next engine in the chain via conduit e. The engines are grouped so that the more frequently used engines are on the left in the figure, while the infrequently used engines are grouped together and appear on the right in the figure.

The chain of engines 40 to the left are placed in a system, such as illustrated in FIG. 1, which does not contain an external heater. The heat exchanger branch are connected serially in between the coolant valve 21 outlet and the propellant heat exchanger 15 to place the branch in the recirculative coolant loop. The chain of engines 41 to the right are placed in a complementary cooling system included on-board the space craft which is constructed in accordance with FIG. 4 and contains the external auxiliary heater arrangement. Thus the heat exchanger branch in chain 41 are connected between the outlet of bypass valve 33 and the inlet end of propellant heat exchanger 15, placing the heat exchangers in the recirculative coolant loop.

The rocket engines that are frequently fired will generate sufficient heat to maintain the coolant fluid above a minimum temperature as might be specified. Those rocket engines that are infrequently fired will likely require external heat to condition the propellant valves and the propellant as described in connection with the embodiment of FIG. 4.

The invention offers a means of transferring thermal energy, simply and efficiently, between a rocket combustion chamber and a propellant in an in-flight environment. It permits the rocket engines to be constructed of low cost, easy to fabricate, relatively low melting temperature materials, such as stainless steel, providing substantial reduction in capital costs, material costs and production time associated with rocket engine manufacture.

The invention permits rocket engines to operate with large thermal margins, thereby lowering risk of failure or premature termination of its operational life and enhancing safety for any on-board space craft personnel. It also enhances safety due to the fact that the cooling fluid pressure can be higher than the combustion chamber pressure, whereby any crack or burn-through of the combustion chamber wall creates a flow of inert fluid into the chamber instead of permitting a hot gas flame to shoot out from the chamber through the crack as could occur in existing systems. Ancillary thereto, the invention also provides an easy technique for warming and/or vaporizing one or more propellants.

As those skilled in the art appreciate, the cooling system adds a not insignificant weight to the space craft's load, takes up valuable space within the spacecraft, and adds some electrical power load to the spacecraft's power supply. It would not be appropriate for spacecraft in which weight and space and/or electrical power are unduly constrained. However, for space craft not burdened by those constraints, the invention offers valuable benefit.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. In a space craft comprising a rocket engine means, a liquid propellant reservoir for storing liquid propellant, and protellant conduit feed means for supplying propellant from said liquid propellant reservoir to aid srocket engine means, the combination comprising:

a coolant reservoir for storing and disposing coolant fluid; and recirculative coolant means coupled to said coolant reservoir for circulating coolant fluid in a recirculating loop between said coolant fluid reservoir, said rocket engine means, and said propellant conduit feed means;

said coolant fluid absorbing heat generated by said rocket engine means to cool said rocket engine means and transferring a portion of said heat to said propellant conduit feed means for warming propellant supplied by said propellant conduit feed means;

said recirculative coolant means further comprises:

engine heat exchanger means, having a coolant fluid inlet for receiving coolant fluid and a coolant fluid outlet for expressing coolant fluid passing through said engine heat exchanger means;

propellant heat exchanger means, having a coolant fluid inlet for receiving coolant fluid and coolant fluid outlet for expressing coolant fluid passing through said propellant heat exchanger means;

coolant pump means having a coolant fluid inlet and coolant fluid outlet for pumping coolant received at said inlet out said outlet;

conduit means for connecting said fluid inlets and outlets of each of said engine and propellant heat exchanger means and said pump means in series in said recirculating coolant loop;

a coolant fluid tank, said coolant fluid tank having a fluid outlet connected to said conduit means for supplying coolant fluid into and receiving coolant from said recirculating coolant loop;

said propelled heat exchanger means being positioned in said recirulating loop following said engine heat exchanger means;

said engine heat exchanger means for transferring heat generated in said rocket engine to coolant fluid flowing though said engine heat exchanger means to warm said coolant fluid, whereby coolant fluid flowing through said engine heat exchanger means increases in temperature;

said propellant heat exchanger means for transferring heat from coolant fluid flowing through said propellant heat exchanger means to said liquid propellant to warm and/or vaporize said liquid protellant expressed from said liquid propellant reservoir, whereby coolant fluid flowing through said propellant heat exchanger means decreases in temperature; and first coolant valve means for controlling coolant flow within said recirculating coolant loop, said coolant valve being located at a position in said recirculating coolant loop between said coolant pump mean's coolant fluid outlet and said engine heat exchanger means.

2. The invention as defined in claim 1, wherein said space craft further includes:

auxiliary heat generator means separate from said rocket engine means;

external heat exchanger means, having a coolant fluid inlet for receiving coolant fluid and a coolant fluid outlet for expressing coolant fluid;

said external heat exchanger means being thermally coupled in heat transfer relationship with said heat generator means for transferring heat from said heat generator means to coolant fluid flowing through said third heat exchanger means; and bypass means for diverting coolant fluid from said recirculating loop and directing coolant fluid to flow through said external heat exchanger means.

3. The invention as defined in claim 2, wherein said bypass means further comprises:

first bypass coolant fluid valve means, said first bypass coolant valve being normally open when unoperated to permit coolant flow between said first coolant valve means and said engine heat exchanger means associated with said rocket engine means and, when operated, for closing to interrupt said coolant flow;

second bypass coolant fluid valve means, said second bypass coolant fluid valve means being normally open, for closing upon operation to permit coolant flow between said coolant pump outlet and said inlet of said external heat exchanger means when operated;

third bypass coolant fluid valve means, said third bypass coolant fluid valve means being normally open, for closing upon operation to permit coolant flow between said outlet of said external heat exchange means and said engine heat exchanger means.

4. The invention as defined in claim 2, wherein said heat generator means comprises electrical heater means.

5. The invention as defined in claim 3, wherein said heat generator means comprises: electrical heater means; and wherein said coolant fluid comprises at least one of the fluids selected from the group consisting of: water, ethylene glycol, Freon and Ammonia.

6. In a space craft comprising a rock engine means, a liquid propellant reservoir for storing liquid propellant, and propellant conduit feed means for suppylying propellant from said liquid propellant reservoir to said rocket engine means, said rocket engine means comprising: a plurality of rocket engines, the combination comprising:

a coolant reservoir for storing and dispensing coolant fluid; and recirculative coolant means coupled to said coolant reservoir for circulating coolant fluid in recirculating loop between said coolant fluid reservoir, said rocket engine means, and said propellant conduit feed means, said recirculative coolant means including engine heat changer means;

said coolant fluid absorbing heat generated by said rocket engine means to cool said rocket engine means and transferring a portion of said heat to said propellant conduit feed means for warming propellant supplied by said propellant conduit feed means; and wherein said engine heat exchanger means comprises: a plurality of heat exchangers; each of said plurality of heat exchangers being associated with a respective one of said plurality of rocket engines, and said plurality of heat exchangers being connected in series circuit, wherein coolant fluid flows through said heat exchangers seriatum.

7. In a space craft comprising a rocket engine means, a liquid propellant reservoir for storing liquid propellant, and propellant conduit feed means for supplying propellant from said liquid propellant reservoir to said rocket engine means, the combination comprising:

a coolant reservoir forming and dispensing coolant fluid; and recirculative coolant means coupled to said coolant reservoir for circulating coolant fluid in a recirculating loop between said coolant fluid reservoir, said rocket engine means, and said propellant conduit feed means, said recirculative coolant means including heat exchanger means;

said coolant fluid absorbing heat generated by said rocket engine means to cool said rocket engine means and transferring a portion of said heat to said propellant conduit feed means for warming propellant supplied by said propellant conducted means;

propellant valve means associated with said rocket engine means for controlling flow of propellant from said propellant conduit feed means to said rocket engine means; and propellant valve heat exchanger means;

said propellant valve heat exchanger means being located in said recirculating coolant loop following said heat exchanger means for transferring a portion of heat from said coolant fluid to said propellant valve means.

8. The invention as defined in claim 6, further comprising:

a plurality of propellant valve means, each of said valve means being associated with a respective one of said rocket engines for controlling flow of propellant from said propellant conduit feed means to the associated rocket engine;

a plurality of propellant valve heat exchanger means, each of said propellant valve heat exchanger means being associated with a respective one of said propellant valve means and each said propellant valve heat exchanger means being located in said recirculating coolant loop following the one of said heat exchangers associated with the rocket engine associated with said respective one of said propellant valve means for transferring heat to said respective one of said propellant valve means.

9. The invention as defined in claim 5, wherein said rocket engine means comprises: a plurality of rocket engines; and wherein said engine heat exchanger means comprises: a plurality of heat exchangers; each of said plurality of heat exchangers being associated with a respective one of said plurality of rocket engines, and said plurality of heat exchangers being connected in series circuit, wherein coolant fluid flows through said heat exchangers seriatum; and further comprising:

propellant valve means associated with said rocket engine means for controlling flow of propellant from said propellant conduit feed means to said rocket engine means;

propellant valve heat exchanger means; said propellant valve heat exchanger means being located in said recirculating coolant loop following said heat exchanger means for transferring a portion of heat from said coolant fluid to said propellant valve means.

10. In a space craft comprising a rocket engine, a liquid propellant reservoir for storing liquid propellant, and propellant conduit feed means for supplying propellant from said liquid propellant reservoir to said rocket engine, the combination comprising:

coolant fluid means for receiving, storing and dispensing coolant fluid;

first heat transfer means for receiving coolant fluid fronted coolant fluid means;

said coolant fluid means including:

heating means for warming coolant fluid supplied to said first heat transfer means;

second heat transfer means for receiving coolant fluid from said first heat transfers means;

said coolant fluid means being coupled to said first heat transfer means for supplying coolant fluid thereto and being coupled to said second heat transfer means for receiving coolant fluid therefrom to complete a recirculating coolant loop;

said first heat transfer means further including means for receiving heat generated by said rocket engine and transferring said received heat to said coolant fluid recevied from said coolant fluid means; and said second heat transfer means further including means for transferring heat from said coolant fluid received from said first heat transfer means to said propellant conduit feed means for heating propellant fluid in said propellant conduit feed means, whereby a portion of heat generated by said rocket engine is used to warm said propellant fluid.

11. The invention as defined in claim 10, wherein said spacecraft includes a source of heat; and wherein said heating means further comprises:

third heat transfer means for supplying coolant fluid to said first heat transfer means;

said third heat transfer means for receiving heat generated by said source of heat and transferring said heat to said coolant fluid, whereby the coolant fluid is warmed prior to being supplied to said d first heat transfer means.

12. The invention as defined in claim 11, wherein said source of heat comprises electrical heater means.

13. In a space craft comprising a rocket engine, a liquid propellant reservoir for storing liquid propellant, and propellant conduit feed means for supplying propellant from said liquid propellant reservoir to said rocket engine, the combination comprising:

coolant fluid means for receiving, storing and dispensing coolant fluid;

first heat transfer means for receiving coolant fluid from said first heat transfer means;

second heat transfer means being coupled to said first heat transfer means for supplying coolant fluid thereto and being coupled to said second heat transfer means for receiving coolant fluid therefrom to complete a recirculating coolant loop;

said first heat transfer means further including means for transferring heat form said coolant fluid received form said first heat transfer means to said propellant conduit feed means for heating propellant fluid in said propellant conduit feed means, whereby a portion of heat generated by said rocket engine is used to warm said propellant fluid;

said propellant conduit means including propellant valve means for controlling flow of propellant form said propellant conduit means to said rocket engine; and said first heat from said coolant fluid to said propellant valve to warm said propellant valve.

14. The invention as defined in claim 12, wherein said propellant conduit means includes propellant valve means for controlling flow of propellant from said propellant conduit means to said rocket engine; and wherein said first heat exchanger means further includes means for transferring heat from said coolant fluid to said propellant valve to warm said propellant valve; and wherein said coolant fluid means further comprises:

pump means for pumping coolant fluid in said recirculating coolant loop;

coolant fluid reservoir means for communicating coolant fluid within said recirculating coolant loop; and coolant valve means for controlling flow of coolant fluid in said recirculating coolant fluid loop; and wherein said coolant fluid comprises water.

* * * * *